United States Patent
Yamamoto

[11] Patent Number: 5,953,364
[45] Date of Patent: Sep. 14, 1999

[54] PILOT SIGNAL DETECTING METHOD, PILOT SIGNAL DETECTING APPARATUS, AND RECEIVER

[75] Inventor: Katsuya Yamamoto, Kanagawa, Japan

[73] Assignee: Sony Corporation, Tokyo, Japan

[21] Appl. No.: 08/824,974

[22] Filed: Mar. 27, 1997

[30] Foreign Application Priority Data

Apr. 2, 1996 [JP] Japan .................................... 8-106223

[51] Int. Cl.$^6$ .................................................. H04B 1/69
[52] U.S. Cl. ...................... 375/200; 370/335; 370/342; 370/441; 370/491; 375/206
[58] Field of Search ..................... 375/200, 206; 370/335, 342, 441, 491; 455/137, 273

[56] References Cited

U.S. PATENT DOCUMENTS

| | | | |
|---|---|---|---|
| 5,490,165 | 2/1996 | Blakeney, II et al. | 375/208 |
| 5,548,613 | 8/1996 | Kaku et al. | 375/208 |
| 5,699,380 | 12/1997 | Sugita | 375/208 |
| 5,812,543 | 9/1998 | Sugita | 370/335 |
| 5,832,025 | 11/1998 | Yamamoto | 375/200 |

*Primary Examiner*—Don N. Vo
*Attorney, Agent, or Firm*—Jay H. Maioli

[57] ABSTRACT

In a pilot signal detecting method, a pilot signal detecting apparatus, and a receiver, deterioration of communication quality can be prevented in environments where out-of-lock is more likely to occur due to a reduced reception level of a pilot signal. When a demodulator is suffering from out-of-lock with an assigned timing, timings used in respective demodulators are excluded from timing candidates to be newly assigned to the demodulator in the out-of-lock state, such that a timing of a pilot signal, with which a received signal can be demodulated, is selected from the remaining timing candidates. Since the timings currently used in the respective demodulators in a receiver are excluded from timing candidates to be newly assigned so that a new timing selected from the remaining timing candidates is assigned to the demodulator in the out-of-lock state, it is possible to prevent second out-of-lock and accordingly avoid the receiver falling into repetitions of the detection of a pilot signal and the assignment of a timing to a demodulator in the out-of-lock state.

3 Claims, 3 Drawing Sheets

PILOT SIGNAL DETECTING METHOD, PILOT SIGNAL DETECTING APPARATUS, AND RECEIVER

BACKGROUND OF THE INVENTION

1. Field of the Invention

This invention relates to a pilot signal detecting method, a pilot signal detecting apparatus, and a receiver, which are suitably applied to a mobile communication system which employs a code division multiple access scheme.

2. Description of the Related Art

In a code division multiple access (CDMA) scheme, a particular code (hereinafter this code is referred to as the pseudo random noise sequence (PN) code) assigned to each line is used to spread modulated waves at the same carrier frequency over a wider frequency band than its original frequency band (this technique is referred to as "spread-spectrum"), and respective spread-spectrum modulated waves are multiplexed for transmission. Received spread-spectrum signals are synchronized with a PN code applied through a line which carries a signal to be demodulated, so as to only identify a desired line.

More specifically, the transmission side of the system assigns a different PN code for each line. Here, the PN code comprises a series of pseudo random codes. Then, the transmission side multiplies respective modulated waves to be transmitted through the lines by the respective PN codes to spread the modulated waves. In this regard, the respective modulated waves undergo predetermined modulation processing prior to the spread spectrum processing. The respective modulated waves thus spread are multiplexed for transmission.

On the reception side of the system, on the other hand, received signals transmitted thereto from the transmission side are multiplied by the same PN code as that assigned to a line which carries a target signal to be demodulated, while maintaining the synchronization between the received signals and the PN code. In this way, only modulated waves transmitted through the target line are demodulated.

As described above, the CDMA scheme allows the transmission side and the reception side to directly communicate with each other every time a call is made, with the only condition being that the same PN code be set in both the transmission side and the reception side. Also, since the CDMA, scheme spreads modulated waves using different PN codes for respective lines, the reception side can demodulate only a spread spectrum signal transmitted thereto through a target line which carries the signal to be demodulated. In addition, since the PN codes include a series of pseudo random codes, it can be said that the CDMA scheme is excellent in security.

In a mobile communication system adopting the CDMA scheme, a base station on the transmission side repetitively transmits a PN code for mobile stations to acquire and maintain synchronization as well as to restore a clock therefrom (hereinafter, this PN code is referred to as the "pilot signal"). A mobile station on the reception side detects respective pilot signals transmitted by a plurality of base stations to assign each detected timing to a demodulator thereof. The mobile station generates the PN code in the demodulator. The demodulator multiplies a spread-spectrum signal transmitted thereto from a target base station by the PN code at an assigned timing to demodulate a desired signal from the target base station.

Stated another way, in a mobile communication system adopting the CDMA scheme, each base station transmits a PN code at different timings from each other. A mobile station detects the timing of the pilot signal supplied from a target base station and synchronizes the PN signal generated in its demodulator with the detected timing of the pilot signal, thereby making it possible to correctly demodulate a spread-spectrum signal transmitted from the target base station.

Note that, although the respective base stations transmit their own PN codes at timings different from each other as mentioned above, the PN codes themselves comprise the same code pattern. Stated another way, the difference in timing of the PN codes between the respective base stations exactly corresponds to the difference in their PN codes.

The pilot signal as mentioned above may suffer from a deviation in reception timing thereof due to movements of the mobile stations and changes in external environment through which the pilot signal is being received. The deviation in reception timing leads to a deviation in synchronization between the timing of a PN code assigned to a demodulator and the timing of the pilot signal. Generally, the deviation in timing is canceled by changing the timing of the PN code generated in the demodulator, thus keeping track of the deviated timing.

However, if fluctuations in timing due to the deviation are larger than the canceling capability of the demodulator, correct demodulation of a received signal is prevented by the deviated timing (so-called out-of-lock). In this case, the mobile station assigns a new timing to the demodulator in the out-of-lock state. In this event, the demodulator is assigned a timing of a pilot signal having a higher reception level as a new timing. Thus, it is highly possible to again assign a timing of a pilot signal which has been used in a demodulator that has experienced out-of-lock. If the same timing is again assigned to the demodulator, the assigned pilot signal can be captured while the assignment of the timing is repeated several times, provided that the mobile station is in a stand-by state.

However, as a reception level of the pilot signal becomes too low to be detected, the out-of-lock state may occur, for example, as is the case of a call made from a mobile station located near the boundary of the coverage of a base station. In such a case, even if the same timing of the pilot signal is again assigned to the demodulator, which has once experienced out-of-lock with this timing, the reception level itself remains reduced unless the external environment around the mobile station is largely improved. Therefore, a similar out-of-lock state is highly likely to occur again in the demodulator. As a result, the mobile station will fall into a so-called ping-pong condition in which the mobile station repeats processes of out-of-lock, detection of the pilot signal, and reassignment of the timing to the demodulator.

Consequently, the mobile station is burdened with an extremely large amount of pilot signal processing, thus resulting in a problem that the communication quality is degraded.

To avoid the problem mentioned above in order to maintain the communication quality during a call, it is necessary to immediately assign a timing of a pilot signal which exhibits a stable magnitude level, to a demodulator in the out-of-lock state, so that the demodulator can demodulate a received signal with the assigned timing.

SUMMARY OF THE INVENTION

In view of the foregoing, an object of this invention is to provide a pilot signal detecting method, a pilot signal detecting apparatus, and receiver in which deterioration of communication quality can be prevented in environments where out-of-lock is highly possible due to a reduced reception level of a pilot signal.

The foregoing object and other objects of the invention have been achieved by the provision of a pilot signal detecting method, a pilot signal detecting apparatus, and receiver, in which when there is a demodulator which is suffering from out-of-lock with a timing assigned thereto, a timing of a pilot signal, with which a signal can be demodulated, is assigned to the demodulator suffering in the out-of-lock state from timing candidates excluding timings used in this demodulator and the remaining demodulators.

Since the timings currently used in the respective demodulators in a receiver are excluded from timing candidates to be newly assigned so that a new timing, with which a signal can be demodulated, is selected from the remaining timing candidates and assigned to the demodulator in the out-of-lock state, it is possible to prevent second out-of-lock and accordingly avoid the receiver falling into repetitions of the detection of a pilot signal and the assignment of a timing to the demodulator in the out-of-lock state.

The nature, principle and utility of the invention will become more apparent from he following detailed description when read in conjunction with the accompanying drawings in which like parts are designated by like reference numerals or characters.

DETAILED DESCRIPTION OF THE DRAWINGS

Preferred embodiments of the present invention will now be described with reference to the accompanying drawings.

Figure 1:
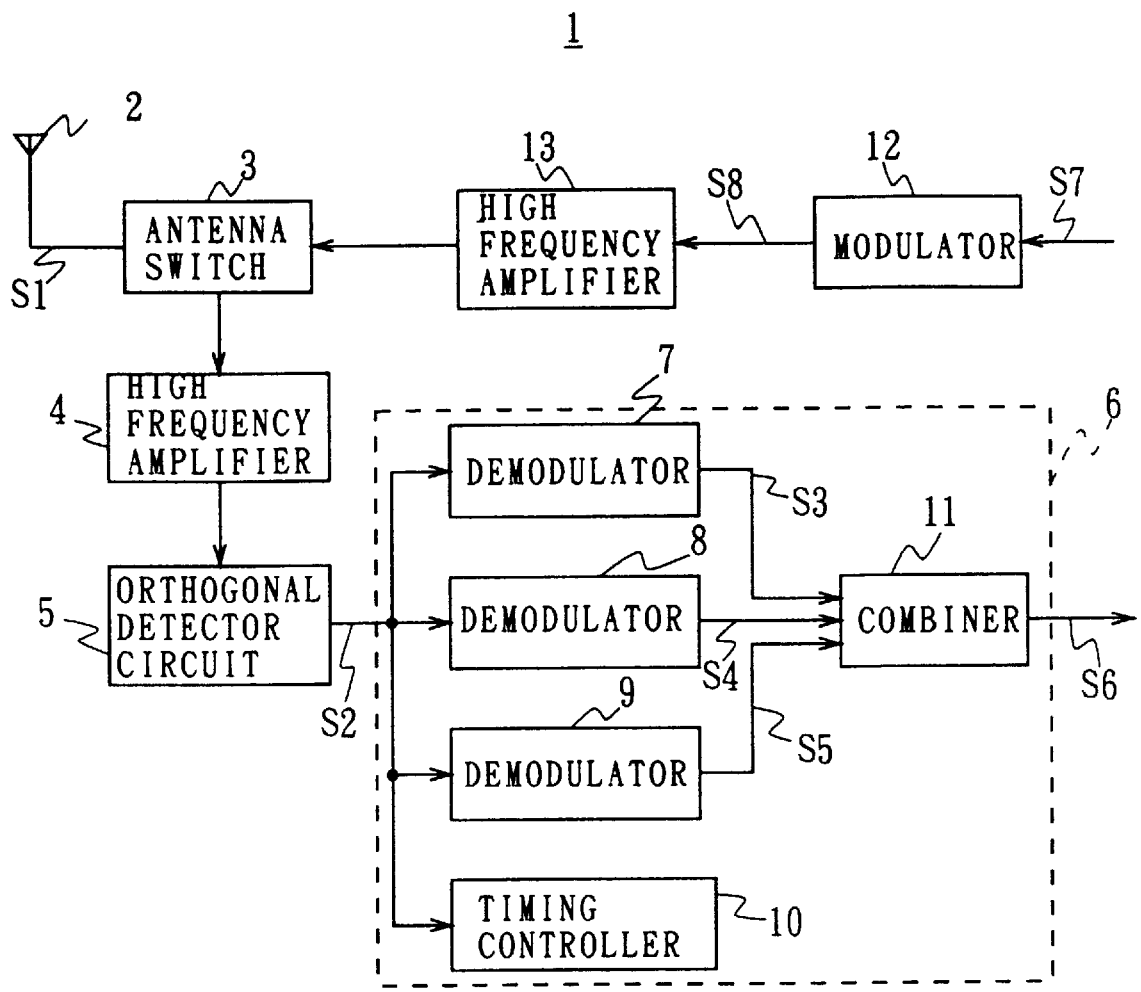
FIG. 1 is a block diagram illustrating a configuration of a mobile terminal apparatus according to an embodiment of the present invention.

Referring to FIG. 1, a mobile terminal apparatus, generally designated by reference numeral 1, receives signals transmitted from a plurality of base stations using a code division multiple access (CDMA) scheme. Specifically, the respective base stations multiply a signal to be transmitted by a pseudo random noise sequence (PN) code which have different timings from each other, in order to generate spread-spectrum transmission data which is then transmitted therefrom. The mobile terminal apparatus 1 receives the transmission data transmitted from the respective base stations, and demodulates a received signal using the timing of the pilot signal included in the received signal. In this way, the mobile terminal apparatus 1 can demodulate only a desired target signal received from a base station. The pilot signal is a pattern signal formed of repetitive PN codes having different timings from each other transmitted from respective base stations on the transmission side, and is used by a mobile station to capture and maintain synchronization and to restore a clock.

The mobile terminal apparatus 1 passes a signal S1, received by an antenna 2, through an antenna switch 3, a high frequency amplifier 4, and an orthogonal detector circuit 5 in this order to convert the received signal S1 to a baseband signal S2. An analog-to-digital (A/D) converter (not shown) converts the resulting baseband signal S2 to digital, and supplies the digital baseband signal S2 to a receiver 6.

In the receiver 6, the supplied baseband signal S2 is inputted to demodulators 7, 8, and 9 and a timing controller 10. The timing controller 10 detects a pilot signal, transmitted from a base station, from the baseband signal S2. The timing controller 10 also assigns a timing based on the thus detected pilot signal to each of the demodulators 7, 8, and 9 (not shown). The demodulators 7, 8, and 9 demodulate the baseband signal S2 at the timings respectively assigned thereto, and send resulting demodulated signals S3, S4, and S5, respectively, to a combiner 11.

Specifically, each of the demodulators 7, 8, and 9 generates a PN code, and demodulates the baseband signal S2 by multiplying the baseband signal S2 by the PN code at the aforementioned timing. Each base station transmits a PN code at a timing unique to the base station. Therefore, it is possible to selectively demodulate only a signal transmitted from a target base station by synchronizing the PN code with the timing indicated by the pilot signal and demodulating the base band signal S2 using the synchronized PN code. The synchronization of a PN code generated in a demodulator with a timing indicated by a pilot signal, as described above, is referred to as "lock".

The demodulators 7, 8, and 9 demodulate the baseband signal S2 supplied thereto using PN codes at different timings from each other. That is, signals transmitted from base stations may be received not only simply through a transmission path of a fixed propagation path length but also through transmission paths having different path lengths due to reflection of the signals by obstacles such as buildings and so on. A plurality of reflected waves received through such a plurality of transmission paths are referred to as "multipath". Actually, since the multipath exists in general, the receiver 6 is provided with the plurality of demodulators 7, 8, and 9 which are operated in accordance with the number of paths or the number of base stations which can receive signals at the receiver 6. In this embodiment, a received signal S1 received through three different transmission paths (i.e., at different timings) is demodulated by the demodulators 7, 8, and 9, respectively.

The combiner 11 receives and combines the demodulated signals S3, S4, and S5 which have been produced from the multipath as mentioned above. In this event, since the demodulated signals S3, S4, and S5 are demodulated at different timings from each other, the combiner 11 synchronizes the timings of the demodulated signals S3, S4, and S5 for combining these demodulated signals S3, S4, and S5. The combiner 11 can then combine the demodulated signals S3, S4, and S5 as mentioned above to generate reception data S6 having a large signal-to-noise ratio and a large signal-to-interference ratio, and outputs the thus generated reception data S6.

In this connection, the mobile terminal apparatus 1 also has a circuit for transmission in which a transmission data S7 is supplied to a modulator unit 12 which performs spread-spectrum processing and offset quadrature phase shift keying (QPSK) processing on the transmission data S7. Then, the mobile terminal apparatus 1 amplifies a modulated signal S5, thus generated by the modulator unit 12, by a high frequency amplifier 13 and radiatively transmits the modulated signal S8 in sequence through the antenna switch 3 and the antenna 2.

Figure 2:
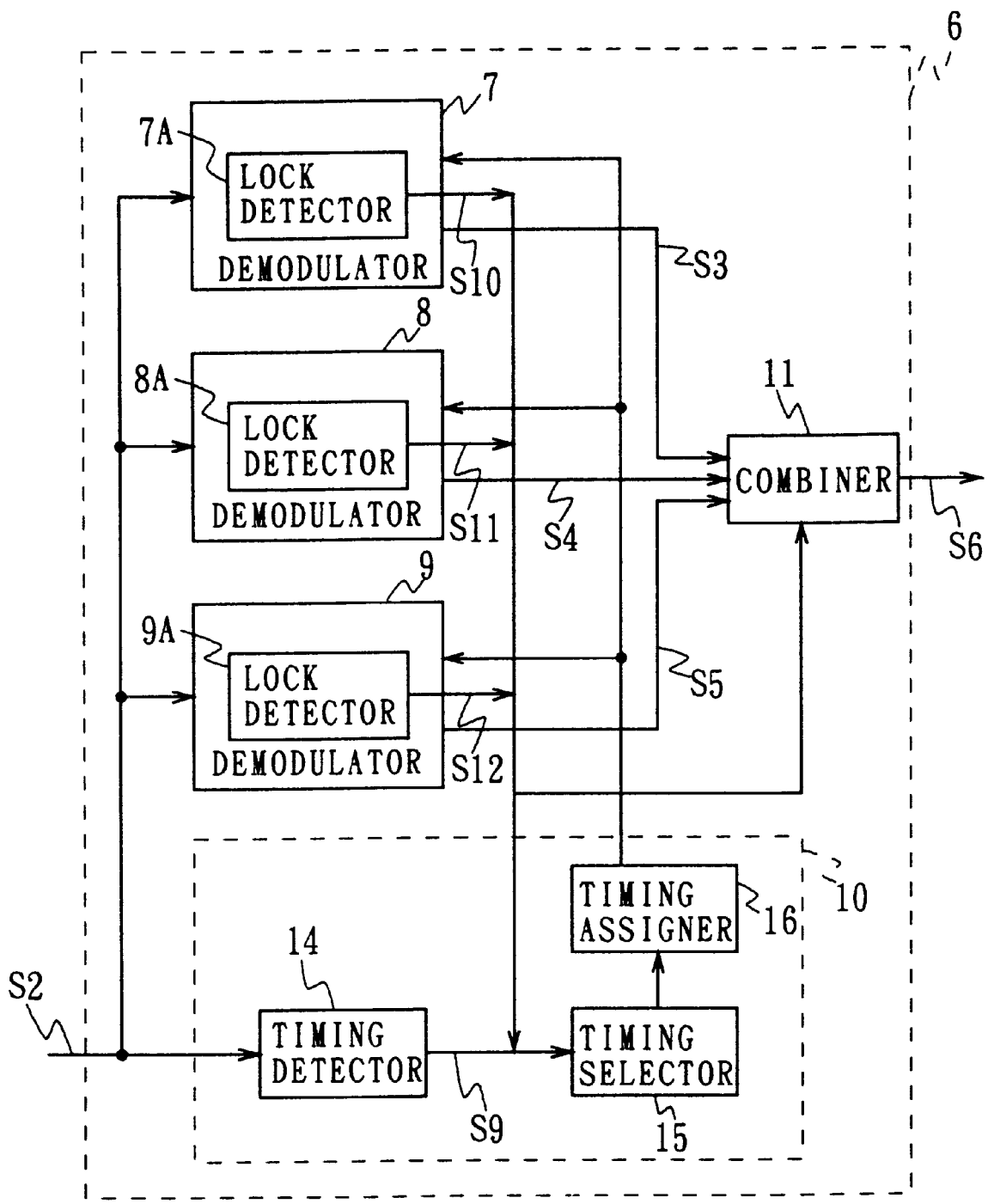
FIG. 2 is a block diagram illustrating a configuration of a receiver and a timing controller according to an embodiment of the present invention.

Referring to FIG. 2, where parts corresponding to those in FIG. 1 are designated by the same reference numerals, there are illustrated a receiver designated by reference numeral 6, and a timing controller generally designated by reference numeral 10.

As illustrated in FIG. 1, a received signal S1 received by the mobile terminal apparatus 1 is sequentially passed through the antenna switch 3, the high frequency amplifier 4, and the orthogonal detector circuit 5 to be converted to a baseband signal S2 which is then A/D converted and supplied to the receiver 6. In the receiver 6, the supplied baseband signal S2 is inputted to the demodulators 7, 8, and 9 and the timing controller 10.

As illustrated in FIG. 2, the baseband signal S2 inputted to the timing controller 10 is first supplied to a timing detector 14. The timing detector 14 detects a pilot signal multiplexed with and included in the baseband signal S2, and obtains a timing corresponding to the detected pilot signal. In this event, the timing detector 14 is adapted to detect a plurality of timings of pilot signals having a reception level high enough to be used for demodulating the received signal S1. Next, the timing detector 14 supplies a timing selector 15 with timing information S9 indicative of the plurality of detected timings and accumulates the timing information S9 therein. In this way, the timing selector 15 accumulates a plurality of timing candidates.

Subsequently, a timing assigner 16 reads the timing information S9 accumulated in the timing selector 15, and assigns timings from the plurality of timing candidates in the order of higher reception level to the respective demodulators 7, 8, and 9 capable of demodulating. Here, reception data S6, which is the output of the mobile terminal apparatus 1 as mentioned above, is generated in such a manner that the combiner 11 combines demodulated signals S3, S4, and S5 which are obtained by demodulating the received signal S1 by the respective demodulators. Thus, since the respective demodulators are assigned different timings for use in demodulation, the reception data S6 can be continuously generated as long as all the demodulators do not experience out-of-lock at the same time.

In addition, the demodulators 7, 8, and 9, assigned the timings as described above, are provided with lock detectors 7A, 8A, and 9A, respectively, for detecting an out-of-lock state thereof. The demodulators 7, 8, and 9 demodulate the baseband signal S2 on the basis of the timings assigned thereto to generate the demodulated signals S3, S4, and S5. The demodulators 7, 8, and 9 also detect whether or not their assigned timings are out of lock by the lock detectors 7A, 8A, and 9A every predetermined time. Thus, the demodulator 7, 8 or 9, if detecting out-of-lock, generates a detection signal S10, S11 or S12 which is notified to the timing selector 15 and the combiner 11;

Referring now to the specific configuration, the respective lock detectors 7A, BA, and 9A have predetermined reception level values previously set therein. Thus, the respective lock detectors 7A, BA, and 9A are designed to determine that "out-of-lock occurs" when the detectors 7A, 8A, and 9A detect a reception level of a pilot signal included in the baseband signal S2 supplied thereto and determine that the detected reception level is equal to or lower than the their respective set values.

The timing selector 15 forces the timing assigner 16 to again read the timing information S9 in response to the notification from the lock detectors 7A, BA, and 9A. The timing assigner 16 assigns a new timing selected from timing candidates, indicated by the read timing information S9, to a demodulator which is in out-of-lock state.

In this event, when the mobile terminal apparatus 1 is receiving the received signals S1 from a plurality of base stations, the timing assigner 16 assigns to any demodulator 7, 8 or 9 in the out-of-lock state a new timing selected from timing candidates excluding not only a timing used in the demodulator 7, 8 or 9 in the out-of-lock state but also timings currently used in any demodulators other than the demodulator in the out-of-lock state.

Also, when the combiner 11 is informed by the notification from the lock detectors 7A, BA, and 9A that any demodulator is in the out-of-lock state, the combiner 11 combines demodulated signals outputted only from the remaining demodulators except for the out-of-lock demodulator to generate reception data S6.

As described above, when the demodulator 7, 8 or 9 is in out-of-lock state, the mobile terminal apparatus 1 and the receiver 6 instruct the timing controller 10 to immediately assign a new timing to the demodulator in the out-of-lock state, thereby making it possible to continuously demodulate a received signal. In addition, since a new timing is selected from timing candidates excluding timings used in the out-of-lock demodulator and all other demodulators and newly assigned to the demodulator in the out-of-lock state, a stable communication quality can be maintained.

In the aforementioned configuration, the mobile terminal apparatus 1 and the receiver 6 execute a procedure described below to detect an out-of-lock timing assigned to any demodulator 7, 8 or 9, and to select a new timing to be assigned to a demodulator in out-of-lock state. Note that the remaining demodulators free from out-of-lock continue the demodulation. In addition, the procedure described below is repeated every time a frame is received.

Figure 3:
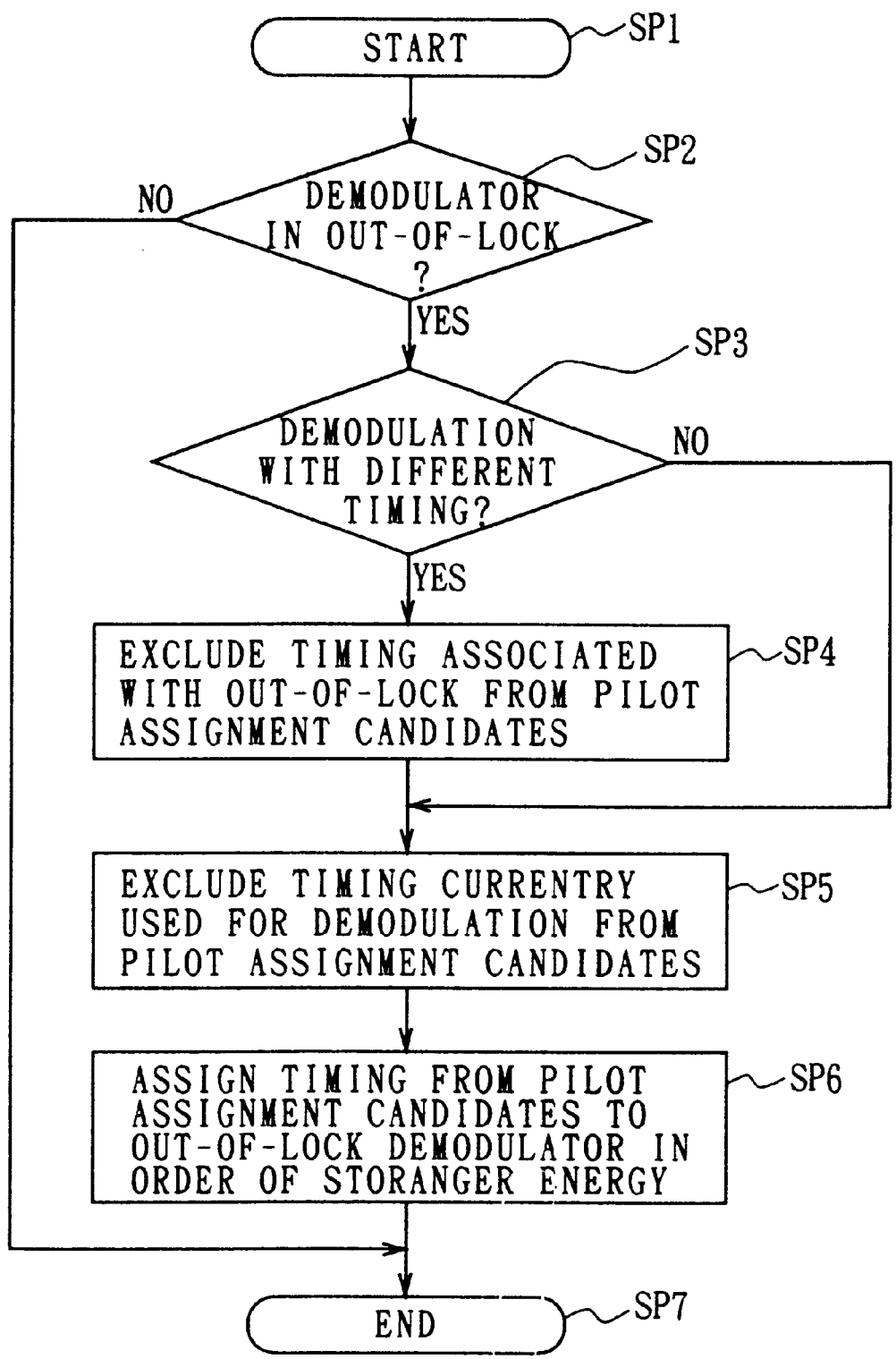
FIG. 3 is a flow chart explaining a procedure for detecting a timing of a pilot signal according to an embodiment of the present invention.

As illustrated in FIG. 3, the procedure begins at step SP1, and it is first determined at step SP2 whether any of the demodulators 7, 8 or 9 are in an out-of-lock state. If all of the demodulators 7, 8, 9 are free from out-of-lock, the procedure jumps to step SP7, and is terminated. If any of the demodulators are determined to be in the out-of-lock state, the procedure proceeds to the following step, i.e., step SP3, where it is determined whether the demodulator in the out-of-lock state is demodulating at a different timing.

Specifically, when the mobile terminal apparatus 1 receives a signal near the boundary of a base station, i.e., in a region where the mobile terminal apparatus 1 can receive a signal transmitted from another base station (in a so-called soft hand-off region), the mobile terminal apparatus 1 receives signals transmitted from the respective base stations, and demodulates the respective received signals at different timings based on pilot signals of the respective base stations. At step SP3, it is detected whether the mobile terminal apparatus 1 is receiving signals in such a situation.

The procedure jumps to step SP5 if the mobile terminal apparatus 1 is only demodulating a signal transmitted from a single base station, and proceeds to the next step SP4 if the mobile terminal apparatus 1 is demodulating signals transmitted from a plurality of base stations.

Next, at step SP4, the timing used in the out-of-lock demodulator is excluded from timing candidates to be newly assigned to the demodulator in the out-of-lock state. Specifically, since the reception level of the pilot signal is generally lower when the mobile terminal apparatus 1 exists in the soft hand-off region, similar out-of-lock occurs with a high possibility if a timing used in a demodulator once experiencing out-of-lock is again assigned. For this reason, the timing used in the out-of-lock demodulator is excluded from timing candidates to be newly assigned thereto, thereby making it possible to avoid repetitive out-of-lock.

Subsequently, at step SP5, timings used in demodulators other than the demodulator in the out-of-lock state are excluded from the timing candidates to be newly assigned. For example, if the demodulator 7 is in the out-of-lock state, timings used in the demodulators 8 and 9 are excluded from the timing candidates to be assigned. This is because a plurality of demodulators are likely to simultaneously fall into out-of-lock if they use the same timing for demodulation. Therefore, by excluding timings used in demodulators other than the demodulator in out-of-lock state from the timing candidates to be newly assigned, it is possible to avoid the simultaneous occurrence of out-of-lock in a plurality of demodulators.

Next, at step SP6, a new timing is selected from the remaining timing candidates and assigned to the demodulator in the out-of-lock state. In this event, the timing exhibiting the highest reception level is selected from the timing candidates and assigned to the demodulator. When the assignment of the new timing has been completed, the procedure is terminated at step SP7.

As described above, when the demodulator 7, 8 or 9 experiences out-of-lock during reception in a soft hand-off region, the mobile terminal apparatus 1 and the receiver 6 select, from timing candidates excluding those currently used in the respective demodulators 7, 8, and 9, a timing of the pilot signal with which received signals can be demodulated, and newly assign the selected timing to the demodulator in the out-of-lock state. Thus, it is possible to prevent second out-of-lock and accordingly avoid the receiver falling into repetitions of the detection of a pilot signal and the assignment of a timing to a demodulator in the out-of-lock state.

According to the aforementioned configuration, when a demodulator 7, 8 or 9 is detected to be in out-of-lock with an assigned timing, timings corresponding to pilot signals used in the respective demodulators are excluded from timing candidates to be newly assigned to the demodulator in the out-of-lock state, and a timing of a pilot signal selected from the timing candidates to be assigned, with which a signal can be demodulated, is assigned to the demodulator in the out-of-lock state. Thereby, it is possible to prevent second out-of-lock and accordingly avoid the receiver falling into repetitions of the detection of a pilot signal and the assignment of a timing to a demodulator in the out-of-lock state. Thus, it is possible to realize the mobile terminal apparatus 1 and the receiver 6 which are capable of preventing a deteriorated communication quality under environments in which out-of-lock is more likely to occur due to a reduced reception level of a pilot signal, such as in a soft hand-off region.

Note that in the aforementioned embodiment, the receiver 6 and the mobile terminal apparatus 1 have three demodulators 7, 8, and 9. However, the present invention is not limited thereto and a receiver and a mobile terminal apparatus having five demodulators can be applied. Stated another way, the present invention can be applied irrespective of the number of demodulators used as long as a receiver and a mobile terminal apparatus utilize a plurality of demodulators based on the CDMA scheme for demodulating received signals.

Further, in the aforementioned embodiment, the present invention is applied to the mobile terminal apparatus 1 having both a reception function and a transmission function. However, the present invention is not limited thereto and can be applied to a mobile terminal apparatus having only a reception function.

Furthermore, in the aforementioned embodiment, the receiver 6 and the mobile terminal apparatus 1 have the demodulators 7, 8, and 9 incorporating the lock detectors 7A, 8A, and 9A, respectively. However, the present invention is not limited thereto and can be applied to a receiver and a mobile terminal apparatus having external lock detectors.

According to the embodiment of the present invention as described above, when a demodulator is suffering from out-of-lock with an assigned timing, the timings used in this out-of-lock demodulator and the remaining demodulators are excluded from timing candidates to be newly assigned to the demodulator in the out-of-lock state, and a timing of a pilot signal, with which received signals can be demodulated, is selected from the timing candidates and newly assigned to the demodulator in the out-of-lock state. Thereby, second out-of-lock can be prevented to avoid the receiver falling into repetitions of the detection of a pilot signal and the assignment of a timing to a demodulator in the out-of-lock state. Thus, it is possible to realize a pilot signal detecting method, a pilot signal detecting apparatus, and a receiver which are capable of preventing a deteriorated communication quality under environments in which out-of-lock is more likely to occur due to a reduced reception level of a pilot signal.

While there has been described preferred embodiments of the present invention, it will be clear to those skilled in the art that various changes and modifications may be made thereto without departing from the true spirit and scope of the present invention.

What is claimed is:

1. A pilot signal detecting method for receiving spread-spectrum signals transmitted from plural base stations using a code division multiple access scheme, detecting pilot signals sent from said base stations from said received spread-spectrum signals, and assigning timings corresponding to said detected pilot signals to each of plural demodulators, said method comprising the steps of:

when a demodulator is in an out-of-lock state with a timing assigned thereto, excluding the timing corresponding to said pilot signal used in said demodulator in the out-of-lock state and timings corresponding to pilot signals used in remaining demodulators from timing candidates to be newly assigned to said demodulator in the out-of-lock state; and assigning a timing corresponding to said pilot signal, with which the received signal can be demodulated, from said timing candidates excluding the timing corresponding to said pilot signal used in said demodulator in the out-of-lock state and the timings corresponding to said pilot signals used in the remaining demodulators to said demodulator in the out-of-lock state.

2. A pilot signal detecting apparatus adapted to receive spread-spectrum signals transmitted from plural base stations using a code division multiple access scheme, detect pilot signals sent from said base stations from said received spread-spectrum signals, and assign timings corresponding to said detected pilot signals to each of plural demodulators, said apparatus comprising:

lock detecting means for detecting a presence or absence of a demodulator which is in an out-of-lock state with a timing assigned thereto;

pilot signal selecting means for excluding the timing used in said demodulator in the out-of-lock state, and timings used in remaining demodulators from timing candidates to be newly assigned to said demodulator in the out-of-lock state, and for selecting a pilot signal with which the received signal can be demodulated from said timing candidates; and timing assigning means for assigning a timing corresponding to said selected pilot signal to said demodulator in the out-of-lock state.

3. A receiver comprising receiving means for receiving spread-spectrum signals transmitted from plural base stations using a code division multiple access scheme, pilot signal detecting means for detecting pilot signals sent from said base stations from said spread-spectrum signals received by said receiving means, and demodulating means for continuously demodulating said received spread-spectrum signals based on said detected pilot signals, said pilot signal detecting means comprising:

lock detecting means for detecting a presence of a demodulator which is in an out-of-lock state with a timing assigned thereto;

pilot signal selecting means for excluding the timing used in said demodulator in the out-of-lock state, and timings used in remaining demodulators from timing candidates to be newly assigned to said demodulator in the out-of-lock state, and for selecting a pilot signal with which the received signal can be demodulated from said timing candidates; and timing assigning means for assigning a timing corresponding to said selected pilot signal to said demodulator in the out-of-lock state.

* * * * *